Dec. 2, 1958 D. S. RIDLER ET AL 2,863,003

HYBRID BALANCING NETWORK FOR A MAGNETIC RECORDER

Filed Feb. 16, 1955

Inventors
D. S. RIDLER -
D. G. N. HUNTER
By Robert Harding Jr.
Attorney

United States Patent Office 2,863,003

Patented Dec. 2, 1958

2,863,003

HYBRID BALANCING NETWORK FOR A MAGNETIC RECORDER

Desmond Sydney Ridler and Donald Gordon Neal Hunter, London, England, assignors to International Standard Electric Corporation, New York, N. Y.

Application February 16, 1955, Serial No. 488,638

7 Claims. (Cl. 179—100.2)

This invention relates to electrical networks which have substantially equivalent electrical characteristics to a magnetic head mounted adjacent a magnetic recording medium and to intelligence storage equipment using such networks.

In intelligence storing systems, such as is the subject of copending application Serial No. 417,071, filed March 18, 1954, intelligence in the form of a variable electric current is passed to a recording head which comprises a coil wound upon a core of magnetic material. The core is generally annular in shape and has a gap in it. This gap is placed close to the surface of a moving magnetic recording medium, such as a tape, wire, disc or drum, so that the recording medium completes the magnetic circuit for the flux set up by the current in the coil. The recording medium is made of a material having a high remanence in order that it shall remain magnetised after the recording influence has been removed.

According to the present invention there is provided an electrical network having substantially equivalent electrical characteristics to a magnetic recording and/or reading head mounted adjacent a magnetic recording medium, and comprising a pair of terminals, a resistor and an inductor connected in series across said terminals, and a closed loop comprising a resistor and an inductor, said inductors being magnetically coupled.

According to the present invention there is further provided an intelligence storage equipment comprising a movable magnetic storage medium or store, a combined reading and recording head mounted adjacent said medium, a hybrid transformer having north, south, east and west windings, said north winding being connected to said head and said south winding being connected to an electrical network having electrical characteristics substantially equivalent to the electrical characteristics of said head when mounted adjacent said recording medium, means for applying intelligence to be recorded in said store to said east winding, and means for amplifying intelligence in said west winding read from said store.

The invention will now be described with reference to the accompanying drawings in which.

Figure 1:
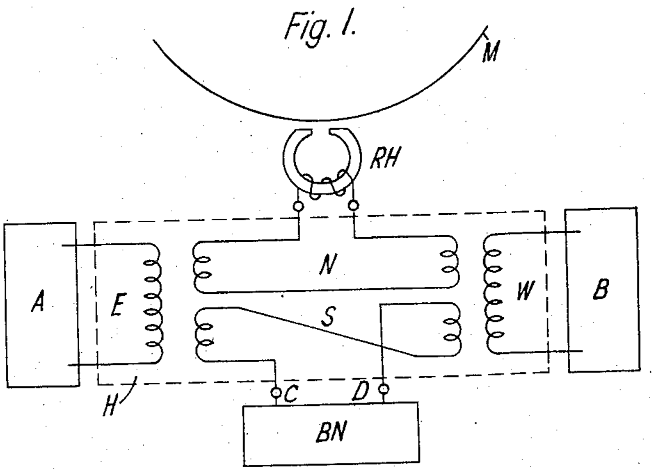
Fig. 1 illustrates an intelligence storage equipment using a combined reading and recording head.

The intelligence storage equipment illustrated in Fig. 1 is partly schematic and shows a hybrid transformer H having first, second, third, and fourth coils, labelled, respectively, N (north), S (south), E (east) and W (west), connected to different parts of the storage equipment. The action of the hybrid transformer will not be described in detail here as it is well known to those skilled in the art.

Connected to coil E is an equipment A which presents to the hybrid transformer the electrical intelligence signals to be recorded by the head RH on the magnetic storage medium M. The action of the hybrid transformer is such that the signals to be recorded do not appear in the coil W.

The head RH performs the dual function of recording intelligence on the magnetic medium and reading intelligence stored on the medium; the coil of the head being connected to the N winding of the hybrid transformer.

The recording medium M is preferably a rotatable brass drum having a skin of magnetic material, such as nickel, on its outside cylindrical surface, but other recording medium, such as magnetic tape, wire or disc may be used.

Intelligence signals read by head RH appear in the hybrid coil W but not in the coil E. The apparatus B amplifies these read signals and utilises them in the desired manner.

In order that the hybrid transformer shall work satisfactorily the balancing network BN connected across the S coil must have electrical characteristics which are as nearly as possible the same as the electrical characteristics of the head RH and magnetic medium M under dynamic conditions.

We have found that a satisfactory balance is obtained if the inductance, resistance, remanence and eddy current losses in the head of a magnetic medium are represented in the same proportions in the network BN. Further we have found that the electrical characteristics just referred to are approximately the same under both static and dynamic conditions.

Figure 2:
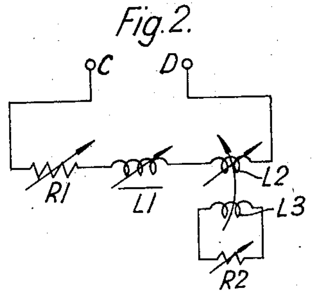
Fig. 2 shows in more detail the components of the balancing network BN illustrated in Fig. 1.

Fig. 2 illustrates a network we have devised to represent the above electrical characteristics. It comprises a resistor $R_1$, an inductor $L_1$ and an inductor $L_2$ in series across the input terminals C and D. Inductively coupled to the inductor $L_2$ is a further inductor $L_3$ forming a closed loop with a resistor $R_2$. The resistor $R_1$ is adjusted to equal the D. C. resistance of the coil in the head RH.

The inductor $L_1$ comprises a coil wound upon a magnetic core having the same dimension and made of the same material as the head RH, but with an adjustable air gap. A coil is wound upon this core when the gap is a minimum such that the remanent flux is slightly greater than the remanent flux in the head RH. The gap is then increased so as to reduce the remanent flux to a value equal to the flux remanent in the head RH.

When the remanent flux has been adjusted according to the above method it is found that the inductance of the coil of $L_1$ is only about half the inductance of the coil in the head RH. It is therefore necessary to add a further coil $L_2$ to balance out the other half of this inductance. The inductor $L_2$ is air cored.

The resistor $R_1$ is adjusted to balance the resistance of the coil on the head RH.

The eddy currents in the drum are balanced by the coil $L_3$ and a variable resistor $R_2$ connected across it. $L_3$ is inductively coupled to the inductor $L_2$; the coupling being adjustable.

It will be appreciated that although the components $R_1$, $R_2$, $L_1$ and $L_2$ are shown in Fig. 2 as adjustable and the coupling between $L_2$ and $L_3$ is also shown adjustable, any or all these components and/or coupling may be preadjusted so that the network is made up of components having fixed values.

While the principles of the invention have been described above in connection with specific embodiments, and particular modifications thereof, it is to be clearly understood that this description is made only by way of example and not as a limitation on the scope of the invention.

What we claim is:

1. An electrical network having substantially equivalent electrical characteristics to a magnetic recording and/or reading head mounted adjacent a magnetic recording medium and comprising a pair of terminals, a resistor and an inductor connected in series across said terminals, said resistor being substantially equal in value to the direct current resistance of said head and said inductor having a remanent flux substantially equal to that of said head, and a closed loop comprising a resistor and an inductor, said inductors being magnetically coupled, said closed loop inductor and resistor having such values that the inductance of the circuit containing said first-mentioned resistor and inductor has the same inductance as said head and the eddy currents of said head are balanced out.

2. A network, as claimed in claim 1, and wherein said series inductor comprises a first inductor having a magnetic core and a second inductor having an air core, said air core and magnetic core inductor being connected in series.

3. A network, as claimed in claim 2, and wherein said loop inductor has an air core and is magnetically coupled to said second inductor.

4. A network, as claimed in claim 3, and wherein said magnetic core has an adjustable air gap.

5. A network, as claimed in claim 4, and wherein each said resistor and said first and said second inductors are adjustable, and said coupling is also adjustable.

6. An intelligence storage equipment comprising a magnetic storage medium, a combined reading and recording head mounted adjacent said medium, a hybrid transformer having first, second, third, and fourth windings so arranged that signals applied to said third winding will appear in said first winding but not in said fourth winding and signals applied to said first winding will appear in said fourth winding but not in said third winding, said first winding being connected to said head and said second winding being connected to an electrical network, as claimed in claim 2, means for applying intelligence to be recorded in said magnetic storage medium to said third winding, and means for amplifying intelligence in said fourth winding read from said storage medium.

7. An equipment, as claimed in claim 6, and wherein said head and said first inductor each comprises a coil wound upon a magnetic core having an air gap, both said cores having similar dimensions and being made of the same material.

References Cited in the file of this patent

UNITED STATES PATENTS

| | | |
|---|---|---|
| 2,499,423 | Selinger | Mar. 7, 1950 |
| 2,535,681 | Johnson | Dec. 26, 1950 |
| 2,649,506 | Gayford | Aug. 18, 1953 |